Patented July 27, 1937

2,088,030

UNITED STATES PATENT OFFICE 2,088,030

MANUFACTURE OF TERPINEOL FROM TERPIN HYDRATE

Walter Christian Meuly, New Brunswick, N. J., assignor to E. I. du Pont de Nemours & Company, Wilmington, Del., a corporation of Delaware No Drawing. Application February 1, 1936, Serial No. 61,941

9 Claims. (Cl. 260—153)

This invention relates to the production of terpineol and more particularly to the dehydration of terpin hydrate to terpineol.

It is an object of this invention to provide an improved process for the manufacture of terpineol, which is characterized by high efficiency and economy. It is a further object of this invention to provide an improved process of converting terpin hydrate to terpineol without resorting to steam distillation. Other and further important objects of this invention will appear as the description proceeds.

Terpineol of perfumery quality is generally obtained by converting suitable compounds, especially pinene and pine oil, into crystallized terpin hydrate, by treatment with moderately strong sulfuric acid. The crude terpin hydrate crystals are purified by suitable operations such as filtration and washing with water or organic solvents; or recrystallization of the washed terpin hydrate from boiling water or organic solvents; or purification by removal of volatile by-product oils contained in the crude terpin hydrate by means of neutral steam distillation.

The terpin hydrate is then converted into terpineol by treatment with dilute acid.

The procedure described in the literature for the latter operation, invariably includes a steam distillation step for the recovery of the terpineol produced. The distillation has in some cases been direct; that is, steam is passed through the aqueous acid solution, and carries along with it the vapors of terpineol. (Compare Beilstein, 4th ed., vol. VI, page 63.) In other cases, an indirect method of distillation is employed; for instance, as follows:

After charging the terpin hydrate to the weak solution of acid, the mixture is heated to the boiling temperature of the mixture. Terpineol is formed by dehydration of terpin hydrate. The terpineol distills with the water vapors. The vapors are condensed, the oily layer of terpineol is separated and the water is returned to the reaction vessel. The crude terpineol is further purified by fractional distillation. The advantage of this procedure consists in the quick removal of the terpineol from the acid, to prevent further dehydration of the terpineol, with formation of terpenes. However, experiments have shown that in either procedure it is impossible to prevent completely this secondary dehydration; and a minimum amount of 18 to 20 parts of terpenes are generally formed with each 100 parts of terpineol.

In addition to this disadvantage, the disclosed procedures entail the evaporation of large quantities of water, since the concentration of the terpineol vapors in the steam which carries them off is on the average not over 5 to 6% by weight (0.6 to 0.7% by volume). Each part of crude terpineol necessitates therefore the consumption of 16 to 20 parts of steam, either by direct passage through the reaction vessel or as a heating medium in the jacket or heating coils of the reaction vessel; and this constitutes an important item in the economy of a low priced product like terpineol.

The acids used in the art for this purpose are typified by phosphoric, oxalic, sulfuric and acid sodium sulfate.

Now, according to my invention the above difficulties are obviated; the heat consumption is reduced to a minimum, and terpineol is produced with a considerably smaller percentage of by-product terpenes than according to the processes of the art.

According to my invention, the dehydration of terpin hydrate is carried out with the customary dilute acids, but in the presence of an organic solvent which is immiscible with water at elevated temperatures. The terpineol which is formed is not distilled with the water vapors, but is dissolved by the organic solvent and thus protected from further attack by the acid. When the dehydration of terpin hydrate is complete, the reaction mass is allowed to cool and separate into layers, and the solvent layer is withdrawn. The terpineol is freed from the solvent by distilling off the latter, and may be further purified by fractional distillation. Both the solvent and the dilute acid may be re-used.

Without limiting my invention to any particular procedure, the following examples are given to illustrate my preferred mode of operation. Parts mentioned are by weight.

Example 1

100 parts of purified terpin hydrate are added to a solution of 25 parts of sulfuric acid (100%) in 475 parts water. 100 parts of benzol are added, and the mixture is heated to reflux temperature, preferably under agitation. The terpin hydrate gradually goes into solution. The mass is kept at a gentle reflux (73 to 75° C.) until a test-sample cooled to room temperature does not show an appreciable amount of terpin hydrate crystals. This point will generally be reached after a total reaction time of 4 hours. The mass is then cooled to 30 to 40° C., and the supernatent layer of benzol and terpineol is separated. It is washed with water, and subjected to distillation for the recovery of benzol. It is then further subjected to fractional distillation for the separation into terpenes and terpineol.

The yield of terpineol is very high, and the proportion of terpenes formed is less than 12% by weight.

*Example 2*

The conditions are the same as Example 1, but the acid and benzol employed are those recovered from Example 1. The yield of terpineol is about 1% higher than in Example 1, due to small amounts of terpin hydrate which remained dissolved in the aqueous acid layer.

*Example 3*

100 parts of purified terpin hydrate are added to a mixture of 100 parts toluol and 500 parts of a .3% sulfuric acid solution. The mixture is heated to reflux temperature and refluxed gently for 6 to 8 hours at 85 to 86° C. When cooled to 30 to 40° C., the solvent layer is separated, and the terpineol is isolated as in Example 1. The yield of terpineol is very high, and its terpene content is surprisingly low.

*Example 4*

The acid of Example 3 may be replaced by 500 parts of 2% phosphoric acid, or by 500 parts of 1% sulfuric acid containing 1% sodium sulfate, or by 500 parts of .5% oxalic acid. The results are the same as in the preceding examples.

*Example 5*

100 parts of purified terpin hydrate, 100 parts of technical xylene (boiling point 130° C. to 142° C.), and 500 parts of a 2% phosphoric acid solution are kept at a gentle reflux (95° C.) for 3 to 4 hours. By working up the reaction mixture as in Example 1, terpineol in good yield is obtained.

*Example 6*

Crude terpin hydrate, as obtained by the hydration of pinene or terpineol (pine oil), is purified by steam distilling off, in neutral solution, the volatile oils contained in it.

The aqueous suspension of terpin hydrate is diluted with water to a concentration of about 100 parts of terpin hydrate in 500 parts of water. An amount of a solvent as in Example 1, 3 or 5, equal to the weight of terpin hydrate, is added and enough acid to dehydrate the terpin hydrate at reflux temperature in 4 to 8 hours. If the solvent is toluol, about 1.5 to 2.0 parts of sulfuric acid will accomplish this effect. The reaction mass is worked up as in the preceding examples, and terpineol in very good yield is obtained.

*Example 7*

The reaction product obtained by the hydration of pinene- or terpineol-containing products, such as pine oil, with sulfuric acid of say 20 to 30% strength, is separated from the aqueous acid layer and the mixture of oil and terpin hydrate is washed acid free. By adding about 500 parts of .3% sulfuric acid for 100 parts of terpin hydrate and heating to a gentle reflux, the terpin hydrate may be dehydrated to terpineol over a period of about 3 hours. In this case the residual or by-product oils formed in the hydration step act as the solvent. In order to obtain terpineol of commercial quality it is best to resort to careful fractionation in order to separate the terpineol from the said by-product oils, which would otherwise affect the purity and odor of the terpineol.

It will be understood that the conditions stated in the above examples are merely illustrative, and may be varied within considerable limits.

Thus, while it is most convenient to operate at reflux temperatures (about 85° C. to 96° C.), it is by no means necessary to do so, and a temperature lower than reflux temperature will achieve dehydration, although at a slower rate. The upper temperature limit should best be below 100° C., as higher temperatures tend to produce a larger percentage of terpenes. The preferred reaction temperature is around 75 to 90° C.

Likewise, the acid concentration may vary with the temperature and the type of acid used. If neutral salts are present the amount of acid should be increased. The preferred concentration is the one which causes complete dehydration in 3 to 10 hours and can be readily determined in each case. 0.05 to 10% acid may be employed. In the case of phosphoric acid, a 20% solution has been used by one authority (Beilstein, idid.). But in average practice, a concentration between 0.1 and 2% will be found satisfactory.

The amount of aqueous acid may vary within wide limits, say from 2 to 10 times the volume of the solvent employed, or from 1 to 20 times the weight of terpin hydrate started with.

The invention is not limited to any particular class of acids. In general, any of the acids employed in the art for this purpose may be used. Amongst those tried successfully were: sulfuric acid, acid sulfates, phosphoric acid, acid phosphates, boric acid, hydrochloric acid, oxalic acid, acid oxalates, adipic acid, phthalic acid and toluol sulfonic acid.

As solvents, any organic solvents may be used which are immiscible or practically immiscible with water, provided they are not affected by the conditions of the reaction. It is also desirable that their boiling points be sufficiently removed from the boiling point of terpineol to permit easy separation of the two by fractional distillation. Especially suitable are aromatic hydrocarbons like benzol, toluol, xylol, or mixtures thereof; aliphatic hydrocarbons, especially those boiling between 100° C. and 170° C.; hydroaromatic hydrocarbons of the terpene series, for instance dipentene or terpinolene or the mixtures of terpenic bodies which are formed during the hydration of pinene or pine oil. However, non-hydrocarbons may also be used, for instance ethyl ether, carbon tetrachloride, trichlorethylene, dichlorobenzene, etc. The amount of solvent may be varied within wide limits. The most economic amount is from 50 to 200 parts for each 100 parts of terpin hydrate.

The order of addition of the reactants is immaterial.

It will be observed that this invention constitutes a valuable improvement over the known art, because it permits one to obtain a higher yield of terpineol than is obtained by the steam distillation process. In the cases where the dehydration is effected with cheap, commercially available acids, such as sulfuric, phosphoric or oxalic acid, the amount of by-product terpenes formed has been reduced from about 20% to 10% of the terpineol obtained. This corresponds to an increase of about 10% in the yield of terpineol (compare Beilstein above cited). A further advantage is the considerable saving of steam. The reaction mass may be maintained at or near its reflux temperature with a minimum of steam while the steam distillation processes consume high amounts of steam, due to the low rate of volatility of terpineol with water vapor at 100° C.

I claim:

1. A process for producing terpineol which comprises heating together terpin hydrate and dilute aqueous acid in the presence of an organic liquid which is a solvent for terpineol but immiscible with water.

2. A process for producing terpineol which comprises heating together, at a temperature not above 100° C., a mixture of terpin hydrate, dilute aqueous acid, and an organic solvent which is a solvent for terpineol but substantially immiscible with water at the temperature of the reaction.

3. A process for producing terpineol which comprises heating to reflux temperature a mixture of terpin hydrate, dilute aqueous acid and an organic liquid hydrocarbon which boils at a temperature not above 170° C., continuing the heating until substantially all of the terpin hydrate has been consumed, then cooling the reaction mass, separating the oily phase, and recovering therefrom terpineol.

4. A process for producing terpineol which comprises heating at a temperature of between 70 and 96° C. a mixture of terpin hydrate, dilute aqueous acid, and an organic liquid which is a solvent for terpineol but substantially immiscible with water and boils at a temperature sufficiently removed from the boiling range of terpineol to permit of separation thereof by distillation, continuing the heating until the bulk of the terpin hydrate has been consumed, allowing the mass to separate into layers, separating the oily phase and subjecting the same to fractional distillation to separate the terpineol from the organic liquid.

5. A process as in claim 4, the aqueous acid being of a strength between 0.1% and 2%.

6. A process for producing terpineol which comprises heating a mixture of terpin hydrate, an organic solvent of the benzene series and a 0.3 to 0.5% aqueous solution of sulfuric acid, to the reflux temperature of the mixture, continuing the heating until substantially all the terpin hydrate has been consumed, cooling the mass to a temperature below 40° C., separating the solvent layer which settles out, subjecting the same to distillation to remove the solvent of the benzene series, and subjecting the residual mass further to fractional distillation to separate the terpineol from by-product terpenes.

7. A process as in claim 6, the organic solvent of the benzene series being replaced by an organic hydrocarbon of the terpene series.

8. A process as in claim 6, the organic solvent of the benzene series being omitted and replaced by those terpene hydrocarbons which are formed as by-products in the manufacture of terpin hydrate from pinene or pine oil.

9. In the process of producing terpineol and related compounds by the dehydration of terpin hydrate, the improvement which comprises effecting the dehydration by means of dilute aqueous acid in contact with a water-immiscible organic solvent for terpineol.

WALTER CHRISTIAN MEULY.